United States Patent Office 2,806,405
Patented Sept. 17, 1957

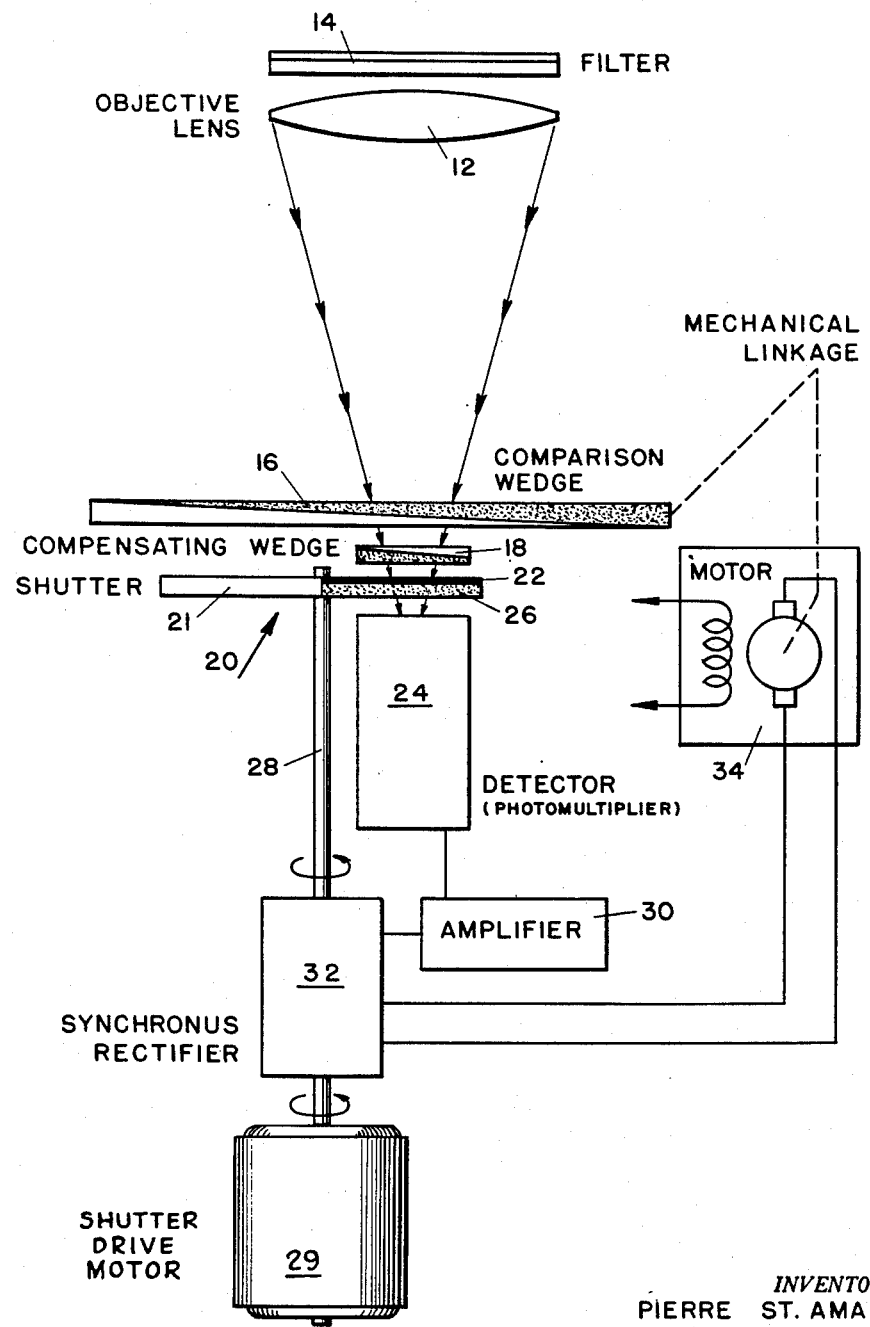

2,806,405

AURORAL AIRGLOW PHOTOMETER SYSTEM

Pierre St. Amand, China Lake, Calif., assignor to the United States of America as represented by the Secretary of the Navy Application June 25, 1956, Serial No. 593,777

10 Claims. (Cl. 88—23)

(Granted under Title 35, U. S. Code (1952), sec. 266)

The invention described herein may be manufactured and used by or for the Government of the United States of America for governmental purposes without the payment of any royalties thereon or therefor.

This invention relates to photometers and more particularly to a system employing a photometer to measure light intensity.

The invention comprises a photometer device which has a rotating shutter interposed between the photometer and the light source to be measured. The shutter has an opaque half with a self-luminous surface on the underside and transparent half. Light from the source passes through the transparent half and is compared by the photometer with the light emitted from the self-luminous surface. If there is a difference in the light intensity an alternating current is set up which is amplified, rectified and supplied to a motor which moves a comparison wedge which is placed between the light source and the shutter in such a way that the light the photometer receives from the source is the same as that it receives from the self-luminous surface. The position of the wedge is used to indicate the light intensity.

In many geophysical observations, measurement must be made in light, the intensity of which may change by several orders of magnitude, such as auroral-airglow observations, twilight sky brightness, eclipse sky brightness and day or moonlight sky brightness. In order to do this with a conventional photometer one must change the sensitivity manually many times in order to retain the registration on a usable portion of the instrument scale. In equipping a chain of photometric stations there is the problem of calibration and the problem of varying sensitivity due to careless operation, changes of voltage and other similar causes. The device described herein is capable of solving these problems at reasonable cost, and is an excellent monitoring instrument well suited to geophysical year applications.

It is an object of the present invention to provide a new and improved device which has application for measurements of nightglow, aurora, twilight, day sky brightness, eclipse observations and any other such application where the intensity of light can be expected to change by several orders of magnitude.

Another object of the invention is to provide a device, as aforementioned, whose response is proportional to the logarithm of the luminous intensity.

A further object of the invention is to provide a new type of photometer which is extremely stable.

Other objects and many of the attendant advantages of this invention will be readily appreciated as the same become better understood by reference to the following detailed description when considered in connection with the accompanying drawing wherein the figure is a schematic drawing of an embodiment of the present invention intended only to illustrate the invention.

Light enters the system through the objective lens 12, after having passed through a narrow band interference filter 14. In order to reach the detector 24 the light must first pass through a comparison wedge 16, a compensation wedge 18 and through shutter 20. Shutter 20 has a transparent half 21 and an opaque half 22. The side of the opaque half 22 nearest the photo detector 24 is coated with a self luminescent compound 26 excited by the element carbon-14 or some other radioactive material.

In operation the shutter is rotated at constant speed through shaft 28 by a small motor 29, so that the cathode of photo detector 24 is alternately exposed to the incident light from the sky, for example, and to the luminous portion 26 of the shutter.

The signal from photo detector 24 is amplified by amplifier 30 and rectified by synchronous rectifier 32. The sense of the rectified signal will depend on whether the light from the sky or the light from the luminous portion 26 of the shutter is greater; the magnitude will depend on the difference in illumination.

The amplified and rectified signal is used to operate a motor 34. The direction of rotation of motor 34 will depend on the sense of the signal, and the speed of rotation of this motor will depend on the magnitude of the signal. The field of motor 34 is separately excited with a unidirectional current, and may or may not be included as a feedback loop.

Motor 34 is mechanically linked to comparison wedge 16. The comparison wedge is therefore moved by the rotor until it is in such a position that the light from the sky is equal to that from the luminous portion of shutter 20.

The position of comparison wedge 16 is then used to indicate the intensity of the incident radiation; this wedge can easily be coupled by a potentiometer to almost any type of recorder.

Since the device is a comparison device, the calibration does not depend upon the sensitivity of any of the electronic components; the effect of a change in gain of any of the electronic components is to change the speed with which a balance can be attained.

The calibration depends only on the stability of the optical wedge 16 and of the luminescent compound 26. The wedge should be fabricated from a good grade Pyrex or other optical glass and should be very permanent, especially if the the temperature of the instrument is maintained constant during operation. The luminous intensity of a carbon-14 excited source should not change by one percent in several centuries. The carbon-14 produces by its decay only soft beta rays that do not damage the phosphor or the matrix in which it is imbedded. The temperature dependence of the brightness can be made quite small and any changes can be avoided by controlling the temperature.

The purpose of the small compensation wedge 18 is to render the optical density constant over the entire field of view. The logarithmic relation between the position of the comparison wedge 16 and the incident luminous intensity is obvious.

It is assumed that by Beer's or Bouguer's law that the intensity of transmitted radiation, I, is related to the thickness of the absorbing medium, T, as follows: $I = I_0 e^{-BT}$, where $I_0$ is the intensity of the incident radiation, $e$ is the base of a system of logarithms, and B is a constant. In such a wedge as employed in the present invention, a perfectly triangular prism of neutral density glass: $T = kx$, where $k$ is the tangent of the wedge angle and $x$ is the distance measured from the thin edge of the wedge. Hence, $I = I_0 e^{-kBx}$; taking logarithms:

$$x = kB \log \frac{I_0}{I}$$

It is possible to grind wedges with different shapes such that a great many scale functions can be developed. However, the linear wedge is easy to grind to a high degree of precision and a logarithmic scale is ideally suited to auroral work.

A second order correction to the logarithmic scale will arise if the neutral density glass is not perfectly neutral, that is, if B depends upon wavelength. Defects of this sort are avoided by selection of glass and by confining observations to a narrow wavelength region.

The intensity of the light from the luminous source 26 could be varied instead of, or in addition to that from the sky. It is more desirable to change the light from the sky however, as this assures a nearly constant illumination, at a safe level, of the photodetector Obviously, many modifications and variations of the present invention are possible in the light of the above teachings. It is, therefore, to be understood that within the scope of the appended claims the invention may be practiced otherwise than as specifically described.

What is claimed is:

1. An auroral airglow photometer system comprising an objective lens through which incident light enters the system after passing through a narrow band interference filter; a light comparison wedge, and a shutter each of which light must pass through to reach a phototube detector; said shutter being half transparent and half opaque and positioned between said comparison wedge and said phototube; the side of said opaque half of the shutter nearest said phototube being coated with a self luminescent compound excited by a radioactive material; said shutter being rotated at a constant speed by a motor so that said phototube is alternately exposed to incident light from the objective lens and to the luminous portion of the shutter; the signal from said detector being amplified and synchronously rectified by an amplifier and synchronous rectifier respectively, the sense of the rectified signal depending on whether the incident light or the light from the luminous portion of the shutter is greater; said rectified signal being used to run a small motor which is mechanically linked to said comparison wedge, the direction of rotation of said motor depending on the sense of said signal and the speed of rotation of said motor depending on the magnitude of said signal, said comparison wedge being moved by said motor until it is in a position where the incident light passing through it is equal to that from the luminous portion of said shutter; the position of said wedge thereby being used to indicate the intensity of incident light radiation.

2. A device as in claim 1 wherein the radioactive material which excites the luminescent material is carbon-14.

3. A device as in claim 1 which includes a compensating wedge positioned between said comparison wedge and said shutter for rendering the optical density constant over the entire field of view of the device.

4. An auroral airglow photometer system comprising an objective lens through which incident light enters the system after passing through an interference filter; a light comparison wedge, a compensation wedge and a shutter each of which light must pass through to reach a photodetective means; said shutter being half transparent and half opaque; a constant light source on the side of the opaque half of said shutter nearest said photodetective means; means for rotating said shutter at constant speed so that the photodetective means is alternately exposed to incident light from the objective lens and to said constant light source; signals from said photodetective means being amplified and rectified, the sense of the rectified signals depending on whether the incident light or the light from the constant light source is greater; means responsive to said rectified signals for moving said comparison wedge, the direction of movement of the comparison wedge depending on the sense of said signal and the speed of movement depending on the magnitude of said signal; said comparison wedge being moved until it is in a position where the incident light passing through it is equal to that from said constant light source; the position of said wedge thereby being used to indicate the intensity of incident radiation; said compensating wedge being positioned between said comparison wedge and said shutter for rendering the optical density constant over the entire field of view of the device.

5. An auroral airglow photometer system comprising a light comparison wedge and a shutter each of which incident light must pass through to reach a photosensitive means; said shutter being half transparent and half opaque; a constant light source on the side of the opaque half of said shutter nearest said photosensitive means; means for rotating said shutter at constant speed so that the photosensitive means is alternately exposed to the incident light and to said constant light source; said photosensitive means producing signals due to said incident and constant light impinging therein; the signals from said photosensitive means being amplified and synchronously rectified, the sense of the rectified signals depending on whether the incident light or the light from the constant light source is greater; means responsive to said rectified signals for moving the comparison wedge, the direction of movement of the comparison wedge depending on the sense of said signals and the speed of movement depending on the magnitude of said signal; said comparison wedge being moved until it is in a position where the incident light passing through it is equal to the light from the constant light source; the position of said wedge indicating the intensity of incident radiation.

6. A device as in claim 5 wherein the means for moving the comparison wedge is a motor mechanically linked to said comparison wedge.

7. A device as in claim 5 which includes a compensating wedge positioned between said comparison wedge and said shutter for rendering the optical density constant over the entire field of view of the device.

8. A device as in claim 5 wherein said photosensitive means is a phototube detector.

9. A device as in claim 5 wherein said constant light source is a self luminescent compound.

10. A device as in claim 9 wherein said self luminescent compound is activated by carbon-14.

References Cited in the file of this patent

UNITED STATES PATENTS

| | | |
|---|---|---|
| 1,551,843 | Nyswander | Sept. 1, 1925 |
| 1,816,047 | Keuffel | July 28, 1931 |
| 2,096,323 | Gille | Oct. 19, 1937 |
| 2,494,607 | Bouchet | Jan. 17, 1950 |
| 2,528,824 | Vassy | Nov. 7, 1950 |